(12) United States Patent
Gentric et al.

(10) Patent No.: US 8,452,926 B2
(45) Date of Patent: May 28, 2013

(54) MEMORY SHARING ARRANGEMENT

(75) Inventors: Philippe Gentric, La Colle sur Loup (FR); Olivier Alavoine, La Colle sur Loup (FR)

(73) Assignee: Texas Instruments Incorporated, Dallas, TX (US)

( * ) Notice: Subject to any disclaimer, the term of this patent is extended or adjusted under 35 U.S.C. 154(b) by 629 days.

(21) Appl. No.: 12/652,589

(22) Filed: Jan. 5, 2010

(65) Prior Publication Data

US 2011/0055490 A1    Mar. 3, 2011

(30) Foreign Application Priority Data

Sep. 2, 2009 (EP) .................................. 09290662

(51) Int. Cl.
*G06F 12/00* (2006.01)
(52) U.S. Cl.
USPC ........................... 711/148; 711/147; 711/152
(58) Field of Classification Search
None
See application file for complete search history.

(56) References Cited

U.S. PATENT DOCUMENTS

| | | | |
|---|---|---|---|
| 4,723,120 A | 2/1988 | Petty, Jr. | |
| 7,441,060 B2 | 10/2008 | Gower et al. | |
| 7,913,022 B1 * | 3/2011 | Baxter | 710/305 |
| 2010/0149858 A1 * | 6/2010 | Abdulla | 365/163 |

OTHER PUBLICATIONS

JEDEC Solid State Technology Association, JEDEC Announces Publication of LPDDR2 Standard for Low Power Memory Devices, Apr. 2, 2009, Arlington, VA.
STn8815P14, Mobile Multimedia Application Processor, Jan. 2008, STMicroelectronics, pp. 1-22.
JEDEC Solid State Technology Association, Low Power Double Data Rate 2 (LPDDR2), Mar. 2009, Arlington, VA, pp. 1-220.
Texas Instruments, OMAP34xx Multimedia Device Silicon Revision 3.1.x, Texas Instruments OMAP Family of Products, Version X, Technical Reference Manual, Jul. 2007, Revised Nov. 2009, pp. 184-185.
Wikipedia: "Emulator"—"Emulators in Computing," Sep. 24, 2012, http://en.wikipedia.org/wiki/Emulator, pp. 1-10.

* cited by examiner

*Primary Examiner* — Sheng-Jen Tsai
*Assistant Examiner* — Ramon A Mercado
(74) *Attorney, Agent, or Firm* — Alan A. R. Cooper; Wade J. Brady, III; Frederick J. Telecky, Jr.

(57) ABSTRACT

A digital system is provided with a memory interposer module configured to be coupled between a processor module and a memory module. The memory interposer module has a memory controller configured to couple to the memory module. It also includes a first memory emulator configured to couple to the processor module via a connector, wherein the first memory emulator is configured to emulate the memory module. There is an arbiter coupled between the memory controller and the memory emulator. A second memory emulator is connected to the arbiter, wherein the second memory emulator is also configured to emulate the memory module. Each memory emulator is operable to stall a memory request when a conflict occurs.

14 Claims, 6 Drawing Sheets

US 8,452,926 B2

MEMORY SHARING ARRANGEMENT

CLAIM OF PRIORITY UNDER 35 U.S.C. 119

The present application claims priority to and incorporates by reference European application number EP 09290662.7, (attorney docket TI-67231EP) filed Sep. 2, 2009, entitled "Memory Sharing Arrangement."

FIELD OF THE INVENTION

The present invention relates to memory sharing arrangements and in particular to the sharing of a single memory resource between multiple processors, especially where that memory resource is standard memory that may be separate from a processor.

BACKGROUND OF THE INVENTION

Package on Package (PoP) is an integrated circuit packaging technique to allow vertically combining discrete logic and memory ball grid array (BGA) packages. Two or more packages are installed on top of one another, i.e. stacked, with a standard interface to route signals between them. This allows higher density and smaller physical size for electronic systems such a mobile telephone or personal digital assistant (PDA). There are two widely used configurations for PoP: pure memory stacking where two or more memory only packages are stacked on top of each other; logic package in the bottom with a memory package on top. For example, the bottom could be an application processor for a cell phone. The logic package is typically placed on the bottom because it requires many more BGA connections to the motherboard.

Various standards are being promulgated for use in PoP packaging applications. For example, JEDEC Standard JESD2009-2 defines a Low Power Double Data Rate 2 (LPDDR2) specification for a ball grid memory package. The standard defines features, functionalities, AC and DC characteristics, packages, and ball/signal assignments. This specification covers the following technologies: LPDDR2-S2A, LPDDR2-S2B, LPDDR2-S4A, LPDDR2-S4B, LPDDR2-N-A, and LPDDR2-N-B. The purpose of this specification is to define the minimum set of requirements for JEDEC compliant 64 Mb through 8 Gb for ×8, ×16, and ×32 synchronous dynamic random access memory (SDRAM) devices as well as 64 Mb through 32 Gb for ×8, ×16, and ×32 for non-volatile memory (NVM) devices.

This standard includes a "data not valid" (DNV) signal that may be used by some memories to report a read error in the case the memory includes error code detection (ECD), or to ask controller to re-send the same read command (retry mode) because some memories after having detected an error with error code detection, can correct the data using error code correction (ECC), but it takes some additional time in the form of extra clock cycles. The DNV signal may be asserted for either read or write transactions, as needed.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
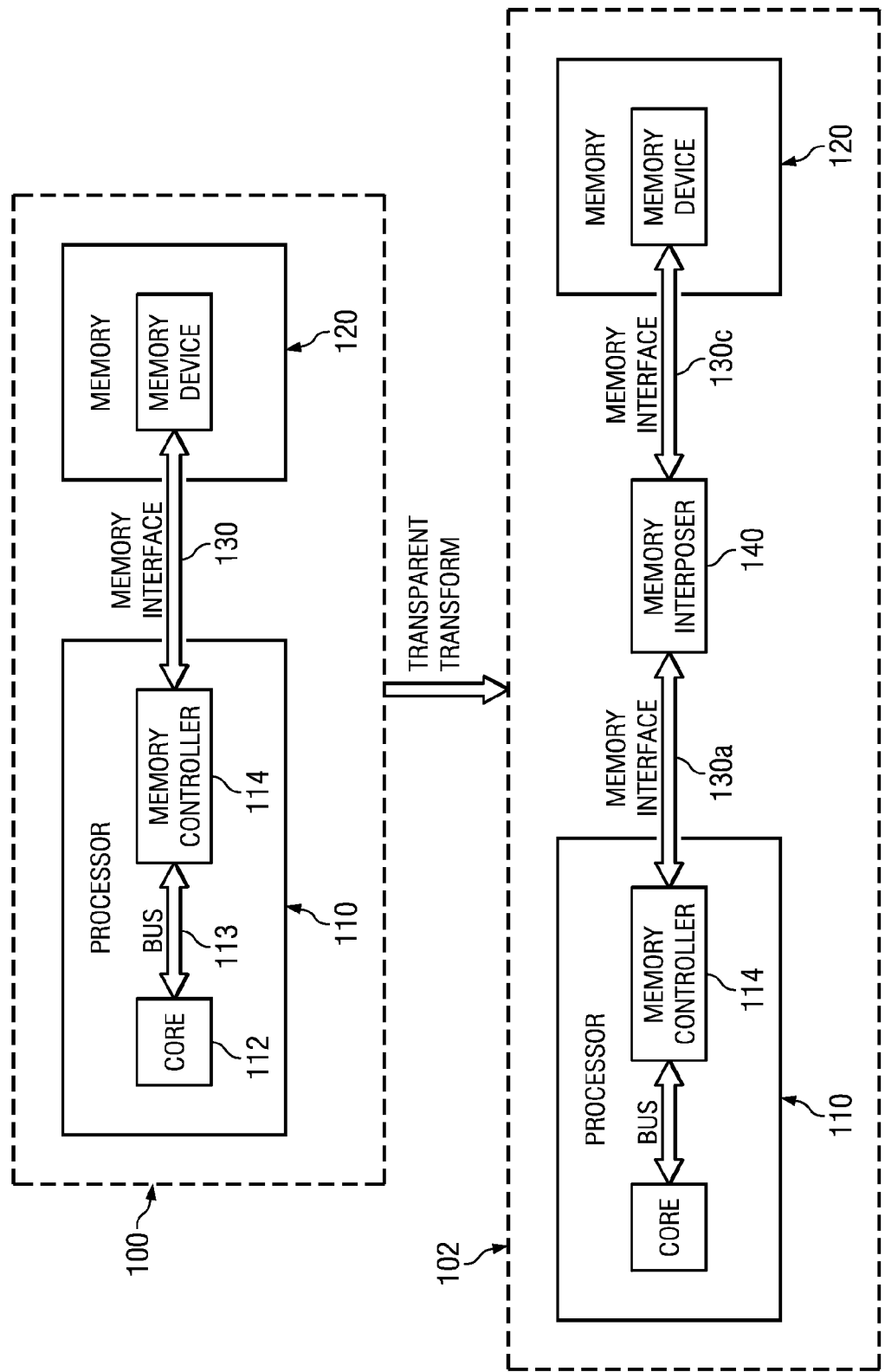
FIG. 1 is a block diagram of an exemplary system that includes a memory interposer.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, while various embodiments of the invention are described herein in accordance with the LDDR2 standard, embodiments for other packaging standards will be understood by one of ordinary skill in the art. Accordingly, embodiments of the invention should not be considered limited to the LDDR2 standard.

Embodiments of the present invention addresses inter alia the following:

Modularity in assembling processing units in general with shared memory such as application processors and coprocessors such as media accelerators or modems;

Compatibility with the usage of POP (Package On Package);

Coprocessor memory which is too large to be embedded or too costly;

Sharing memory between the processor and coprocessor without a dedicated interface.

In an embodiment of the invention, an "intermediary" component, that may be referred to as a memory interposer, may be configured to be coupled between a memory and a memory controller that is associated with a processor. Another embodiment may be configured to allow two or more processor and/or coprocessor packages to communicate with one or more memory packages and thereby provide shared memory between the processor and coprocessor. Another embodiment of the invention provides a coprocessor that may be interposed between a memory and another processor without changes to either the memory or to the processor, and to do that with standard memory interfaces and packaging techniques.

FIG. 1 is a block diagram of an exemplary system 100 that includes a processor 110 and a memory 120 coupled together by a memory interface 130. Processor 110 includes a processor core 112 coupled to a memory controller 114 via a bus 113. Processor 110 is packaged in a ball grid array package with pin-outs from memory controller 114 that conform to the JEDEC LPDDR2 standard. Memory 120 is a LPDDR2 memory module that is packaged in a ball grid array package with pin outs conforming to the LPDDR2 standard.

System 100 may be transparently transformed to system 102 by inserting memory interposer module 140 between processor module 110 and memory module 120. Memory interposer 140 has pin outs to couple to two interfaces 130a, 130c that conform to the JEDEC LPDDR2 standard. In particular, interface 130a includes an arrangement adapted to take account the Data Not Valid [DNV] signal of the LPDDR2 standard (JEDEC) memory interface.

With DNV a LPDDR2 memory can "legally" indicate that the controller is invited to retry. In a first aspect, the interposer provides a transparent transformation to the memory arrangement. Memory interposer 140 emulates a LPDDR2 interface such that memory controller 114 thinks it is connected directly to memory module 120 via memory interface 130a. Similarly, memory interposer 140 emulates a memory controller so that it can be connected directly to memory module 120 via interface 130b. By asserting the DNV signal on interface 130a, the memory interposer can cause memory controller 114 to retry its last memory request. This allows memory interposer 140 to use additional clock cycles to interact with memory 120.

Figure 2:
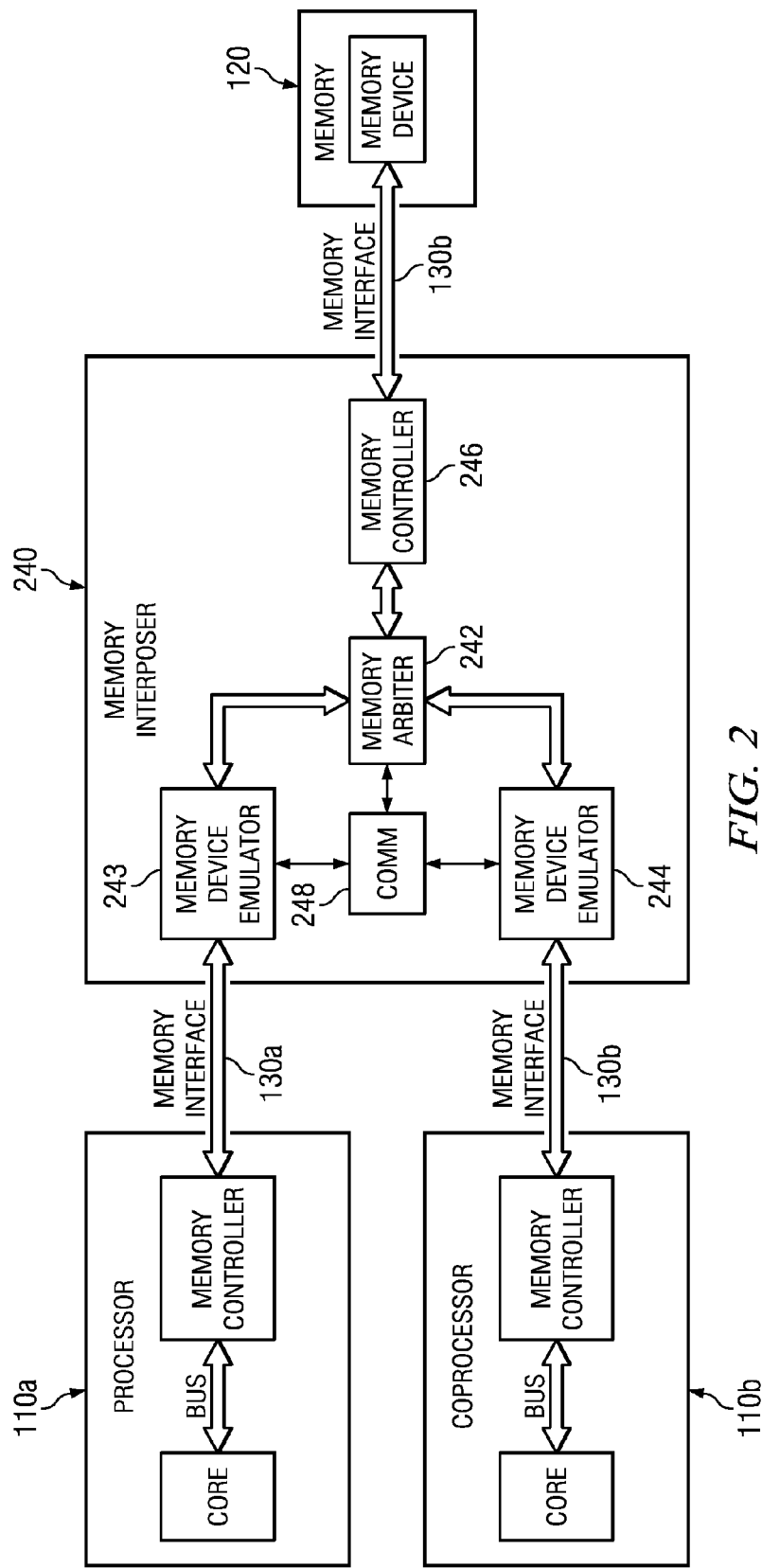
FIG. 2 is a block diagram of an exemplary system that supports two processors with a memory interposer.

FIG. 2 is a block diagram of an exemplary system that supports two processors 110a, 110b with a memory interposer 240. In this exemplary system, memory interposer 240 includes a memory arbiter function 242. Memory device emulator 243 is coupled to processor 110a via a memory interface 130a and memory device emulator 244 is coupled to processor 110b via memory interface 130b, as described with reference to FIG. 1. Arbiter 242 receives memory requests from both of the processors 110a, 110b and forwards each request to memory controller 246 that then initiates a corresponding memory request to memory 120. Arbiter 242 uses a priority scheme to select which request to send to memory controller 245 when it receives more than one request at a time. Various embodiments may be configured with any known priority arbitration scheme, such as round robin, assigning priority levels to each memory device emulator 243, 246, etc.

At the boundary of each module 110a, 110b 120 and 240, the memory interfaces are embodied in connectors. In the embodiment of FIGS. 1-5, the connectors are solder balls located on the ball grid array. In other embodiments, connections between module may be made by ohmic, optical, infrared, capacitance or other types of known connection methods.

In this embodiment, communication circuitry 248 is coupled to memory emulator 243 and to memory emulator 244. The communication circuitry is operable to provide communication between a processor 110a coupled to the first memory emulator and processor 110b coupled to the second memory emulator. Communication between processors is enabled by having one mimic a memory, so that the second processor can read or write data to the first processor as if it is reading/writing a memory. This scheme may be symmetrical, i.e. roles can be reversed, so that the second processor can be configured to act as a memory for the first processor.

Use of communication circuitry 248 to communicate between processors is extremely optimal in terms of latency and bandwidth, i.e. it competes very well with other techniques/buses/standards (e.g. SPI, UNIPRO, USB-inter-IC), and as memory interfaces will evolve, the advantage will be kept: memory interfaces are always at the leading edge of the technology.

In this embodiment, communication logic 248 is also includes configuration logic coupled to arbiter 242, wherein the configuration logic is operable to receive configuration commands for the arbiter from the requesting module via the memory emulator. These commands may be used to specify a different priority assignment, for example. In some embodiments, the configuration logic may be responsive to only one of the memory emulators; in other embodiments the configuration logic may be responsive to both of the memory emulators.

When memory requests from the two processors overlap in time, memory device emulator 243, 244 may stall one of the processors by asserting the DNV signal in the respective memory interface 130a, 130b while the memory request from the other processor is completed. The stalled processor will then retry the memory request according to the LPDDR2 standard until its request can be accepted by arbiter 242 and forwarded to memory controller 246. Table 1 illustrates the general control flow for a memory read request from a first processor 1, such as processor 110a, being delayed by a memory request from a second processor 2, such as processor 110b. Write request may be handled in a similar manner.

TABLE 1

Example memory request flow

Processor1 → memory : Read [xxxx]
Memory → processor1: DataNotAvailable[retry-in yyy ns]
Processor1: wait yyy ns
[during that time the memory interposer can finish outstanding transactions between memory and Processor2]
Processor1 → memory : Read [xxx] (retry)
Memory → processor1: DataAtAddress[xxx]

Stall impact may be minimized by providing an estimation of the waiting time. For LPDDR2, there are two cases: "immediate retry" or "wait for pre-defined time". In the second case, the processor can start a hardware timer and do something else in the mean time, instead of simply waiting or "polling". For LPDDR2, this pre-specified time is given by a control register: Mode Register 29, and is variable from 0 to 240 microseconds.

In this example, processor 110a and 110b are the same, however it should be understood that in various embodiments different types of processors may be coupled to interposer 240 using the standard memory interface 130a and 130b.

Figure 3:
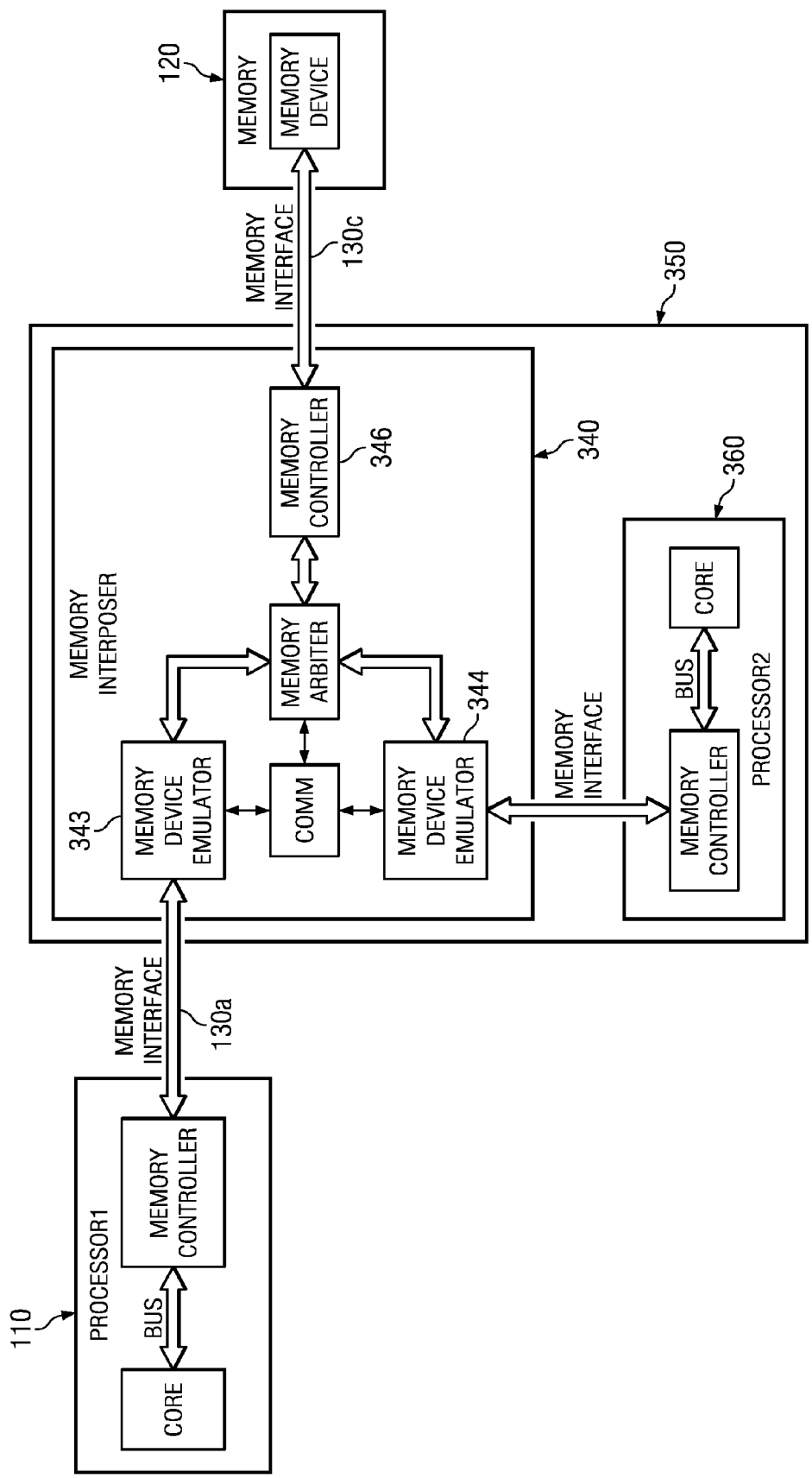
FIG. 3 is a block diagram of an exemplary system in which a coprocessor is included with a memory interposer.

FIG. 3 is a block diagram of an exemplary system in which a coprocessor 360 that includes a processor core and a memory controller is packaged with a memory interposer 340 on the same substrate 350. In this embodiment, memory interposer 340 is similar to memory interposer 240 of FIG. 2. Processor 110 and coprocessor 360 can thereby share memory device 120. Memory interface 130a and 130c are the same as that described in FIGS. 1 and 2, therefore processor 110 and memory 120 may also be the same as described before. Memory device emulator 344 provides a data not valid signal to coprocessor module 360 when memory controller 346 is busy with a memory request from processor 110. In this manner, processor 110 or coprocessor 360 may be instructed to retry a memory request as needed under control of the arbiter in memory interposer 340.

Figure 4:
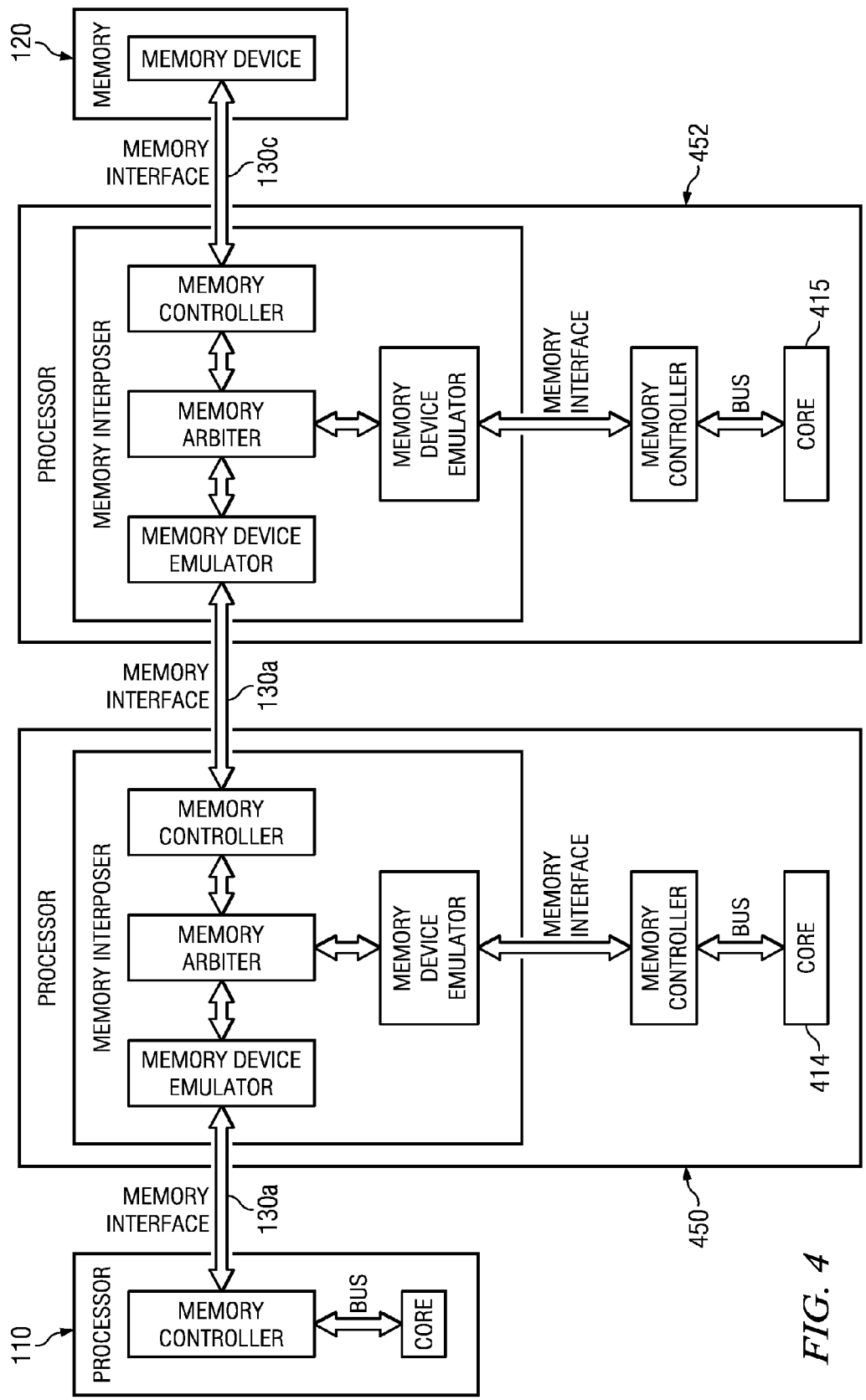
FIG. 4 is a block diagram of an exemplary system that supports multiple processors with a combination of memory interposers.

FIG. 4 is a block diagram of an exemplary system that supports multiple processors with a combination of processor and memory interposer modules 450, 452. Memory interface 130a and 130c are the same as that described in FIGS. 1, 2 and 3, therefore processor 110 and memory 120 may also be the same as described before.

In FIG. 4, two interposer modules are illustrated. In other embodiments more than two modules may be stacked together. The only limitation is the amount of time that can be allocated to propagation of memory requests through the various levels of memory interposers. The multiple interposer+processor subsystems may be stacked together in a cascaded manner, as illustrated in FIG. 4. In another embodiment, multiple interposer+processor subsystems may be interconnected on a substrate in a tree configuration to reduce propagation delay.

In this manner, various system configurations of one, two or more processors and/or coprocessors may be created using the same system component modules. Various sizes and configurations of memory modules may be interchangeably connected to the memory interposer and thereby shared by the multiple processors/coprocessors.

Figure 5:
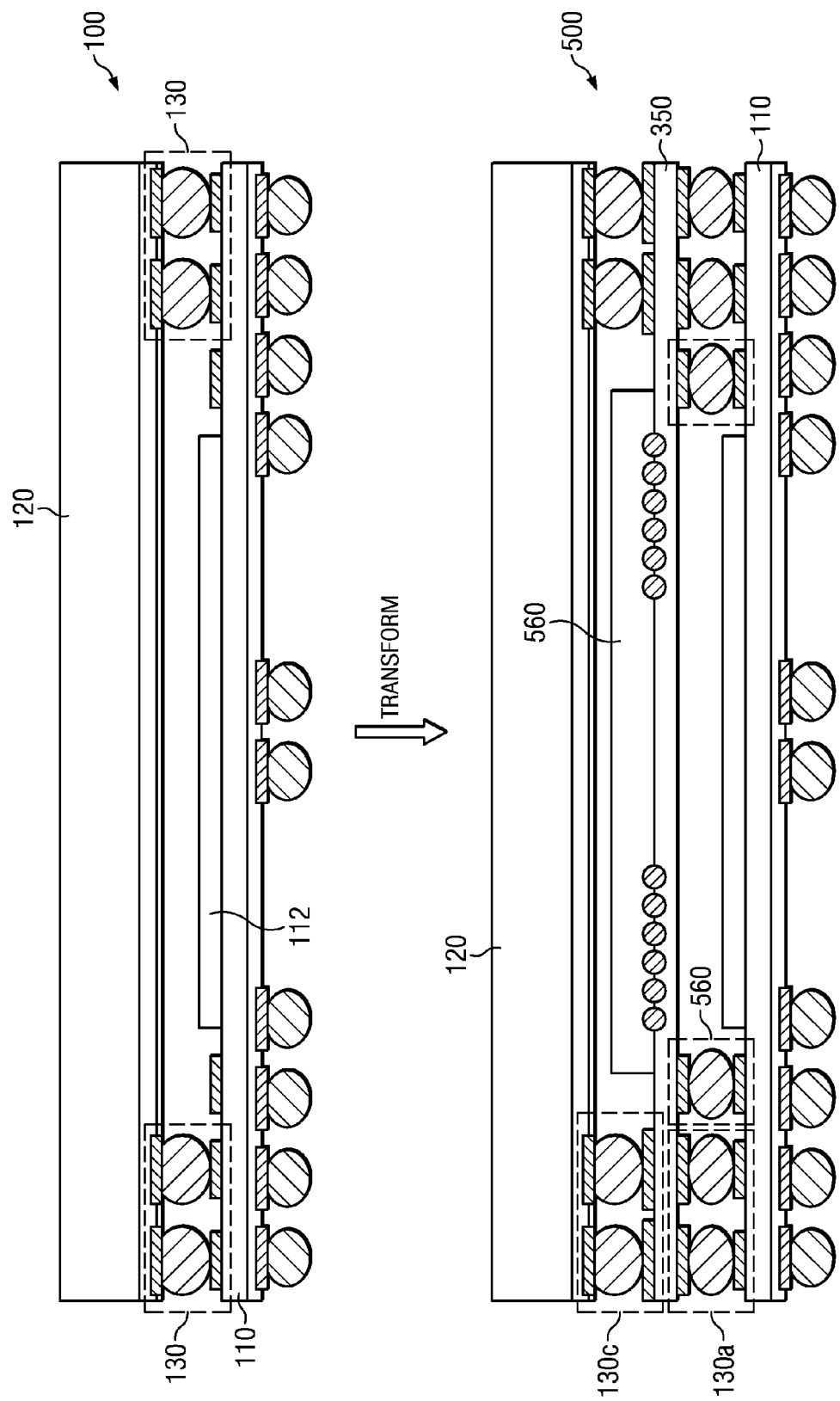
FIG. 5 is an illustration of an exemplary packaging arrangement in which a coprocessor with a memory interposer is included in an interchangeable manner.

FIG. 5 is an illustration of an exemplary packaging arrangement in which a coprocessor packaged with a memory interposer is included in an interchangeable manner. In this example, system 100 is the same as that described with respect to FIG. 1. Processor module 110 is packaged in a ball grid array. Similarly, memory module 120 is packaged in a ball grid array. The two modules may be stacked to form a combined package on package (PoP) module 100. Processor module 110 is coupled to memory module 120 via the LPDDR2 interface indicated generally at 130.

System 100 may be transformed to system 500 by arranging coprocessor module 350 between processor module 110 and memory module 120. This is the same arrangement described with respect to FIG. 3. Coprocessor module 350 includes a memory interposer as described earlier. The memory interface from processor module 110, indicated generally at 130a, is now coupled to the memory emulator 343 (see FIG. 3) on coprocessor module 350. Memory controller 346 (FIG. 3) is coupled to memory module 120 via the memory interface indicated generally at 130c. Additional signals indicated generally at 560 may provide signaling between processor 110 and coprocessor 560. However, memory module 120 may be shared between processor 110 and coprocessor using only the standard interfaces 130a, 130c. As described above, a data not valid signal provided to processor 110 by memory emulator 343 and similarly to coprocessor 560 by memory emulator 344 (FIG. 3) allow both processors to access and share memory module 120 via the LDDR2 standard interface 130c provided on module 120.

For mobile and low cost solutions POP memory is often used. Indeed, putting the memory package on top of the processor package has numerous advantages. The memory is physically close, closer than if it is on the PCB, which is better for performance, power and cost. The printed circuit board (PCB) area is reduced. The bottom ball out of the processor package has less balls, since the memory interface is on the top, this enables less expensive PCB (less metal layers). The memory and its (POP) package is "standard" [JEDEC] enabling the original equipment manufacture (OEM) to leverage several sources and the memory vendor to have volumes.

System Example

Figure 6:
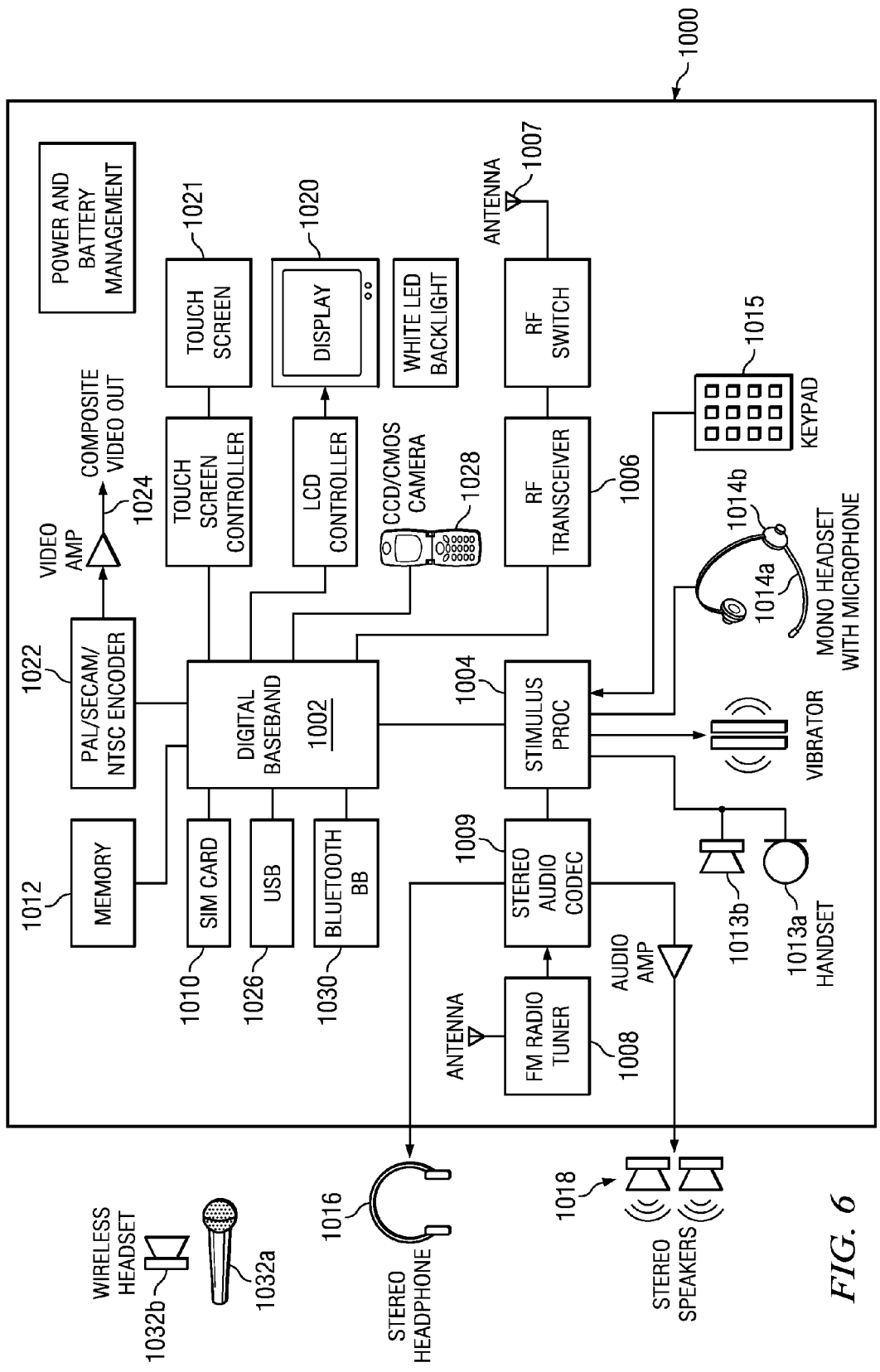
FIG. 6 is a block diagram of an illustrative cell phone that uses an embodiment of a memory interposer.

FIG. 6 is a block diagram of mobile cellular phone 1000. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

DBB 1002, SP 1004 and memory 1012 are embodied as a PoP module. Depending on the configuration of cell phone 1000, the PoP module may include a processor module and a memory module or a processor module, coprocessor module and a memory module, as described with regards to FIGS. 1-5. Various configurations of memory may be embodied in memory module 1012. In each embodiment, a same standard memory interface is used so that the PoP module may be configured as needed by mixing and matching processor, coprocessor and memory modules.

RF transceiver 1106 is a digital radio processor and includes a receiver for receiving a stream of coded data frames from a cellular base station via antenna 1107 and a transmitter for transmitting a stream of coded data frames to the cellular base station via antenna 1107. RF transceiver 1106 is connected to DBB 1102 which provides processing of the frames of encoded data being received and transmitted by cell phone 1100.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards. In some embodiments, audio codec 1109 receives an audio stream from FM Radio tuner 1108 and sends an audio stream to stereo headset 1116 and/or stereo speakers 1118. In other embodiments, there may be other sources of an audio stream, such a compact disc (CD) player, a solid state memory module, etc Other Embodiments The memory interposer architecture is based on intercepting memory traffic between a memory controller (inside a processor) and a memory device (inside a memory). It enables memory sharing between several processors while keeping a similar/standard memory interface. Additionally and advantageously the interposer can be on the same die as the optional processor in the system. Additionally several such interposer+processor subsystems can be inserted in the design.

Therefore, this architecture enables scalable designs and cost savings and fits well with existing standard (LPDDR2) and packaging techniques such as POP.

While the exemplary embodiments described herein conform to the LPDDR2 JEDEC standard, other embodiments may conform to other standards that provide some sort of data not valid signaling mechanism. This may be in the form of a "ready," a "wait" signal or some other form of interlocking signal.

In another embodiment, the memory device emulator logic may include the data-not-valid signal, but the memory module itself does not provide data-not-valid signaling. In this embodiment, memory devices conforming to other memory standards that do not include data-not-valid signaling may be shared between multiple processors.

In another embodiment, the memory device emulator logic may be configured to provide a clock control signal to the memory controller of the requesting processor instead of a data-not-valid signal. In this manner, the requesting processor may be forced to wait for a memory response without the use of a data-not-valid signal.

The embodiments of FIG. 5 illustrate a ball grid array packaging scheme. Other embodiments may use a substrate with a pin grid array, a substrate with surface mounted connector pads, or any other substrate and connector system that can provide a plurality of connection points. Other embodiments may be a system-in-package SIP) in which multiple integrated circuit dies are stacked or otherwise arranged in a single package in which a memory interposer and a coprocessor are included within a same die.

Embodiments of the PoP and SIP packaged systems described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators.

Embodiments of the invention may include embedded coprocessors for various tasks, such as for image processing acceleration, cellular modem, general or specific types of digital signal processing, audio filtering and processing, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

It is therefore contemplated that the appended claims will cover any such modifications of the embodiments as fall within the true scope and spirit of the invention.

What is claimed is:

1. A digital system, comprising a memory interposer module configured to be coupled between a processor module and a memory module, wherein the processor module comprises a first and a second processor, the memory interposer module comprising:
   a memory controller configured to couple to the memory module;
   a first memory emulator configured to couple to the first processor, wherein:
      a) the first memory emulator is configured to emulate the memory module,
      b) the first memory emulator being operable to initiate and assert a stall signal to stall a memory request from the first processor;
   an arbiter coupled between the memory controller and the first memory emulator; and
   a second memory emulator couple to the second processor and connected to the arbiter, wherein
      a) the second memory emulator is also configured to emulate the memory module, and
      b) the second memory emulator being operable to initiate and assert another stall signal to stall a memory request from the second processor; and
   wherein the memory interposer module is located on a ball grid array substrate, and
   wherein the second processor is further located on the ball grid array substrate, and
   wherein the first memory emulator is coupled to a connector comprising a plurality of balls in the ball grid array substrate, and
   wherein the memory interposer module is coupled via the ball grid array connector to the first processor, and is further situated between the first processor and the memory module in a same vertical stack.

2. The memory interposer module of claim 1, wherein the stall signal is a data-not-valid signal asserted in response to a request from the first processor when a request from the second processor is being serviced.

3. The memory interposer module of claim 1, wherein the other stall signal is a data-not-valid signal asserted in response to a request from the second processor when a request from the first processor is being serviced.

4. The memory interposer of claim 1, wherein the memory emulates a low power double data rate 2 (LPDDR2) memory interface.

5. The memory interposer module of claim 1, further comprising configuration logic coupled to the first memory emulator and to the arbiter, wherein the configuration logic is operable to receive configuration commands for the arbiter from the processor module via the memory emulator.

6. The memory interposer module of claim 1, further comprising communication circuitry coupled to the first memory emulator and to the second memory emulator.

7. The digital system of claim 1, further comprising a processor module and a memory module coupled to the memory interposer to form a package-on-package module.

8. The digital system of claim 7 being a cellular telephone.

9. A digital system, comprising a memory interposer module configured to be coupled between a processor module and a memory module, wherein the processor module comprises a first and a second processor, the memory interposer module comprising:

a memory controller configured to couple to the memory module;

a first memory device emulator configured to couple to the first processor, wherein:
    the first memory device emulator is configured to:
        a) emulate the memory module and further configured to
        b) initiate and assert a data-not-valid signal in response to a request from the processor when a request from another requester is being serviced;

an arbiter coupled between the memory controller and the first memory device emulator; and a second memory device emulator configured to couple to the second processor and connected to the arbiter, wherein:
    the second memory device emulator is also configured to:
        a) emulate the memory module and further configured to
        b) initiate and assert a data-not-valid signal in response to a request from the second processor when a request from another requester is being serviced; and wherein the memory interposer module is located on a ball grid array substrate, and wherein the second processor is further located on the ball grid array substrate, and wherein the first memory device emulator is coupled to a connector comprising a plurality of balls in the ball grid array substrate, and wherein the memory interposer module is coupled via the ball grid array connector to the first processor, and is further situated between the first processor and the memory module in a same vertical stack.

10. The memory interposer of claim 9, wherein the memory emulates a low power double data rate 2 (LPDDR2) memory interface.

11. The memory interposer module of claim 9, further comprising configuration logic coupled to the first memory emulator and to the arbiter, wherein the configuration logic is operable to receive configuration commands for the arbiter from the processor module via the memory emulator.

12. The memory interposer module of claim 9, further comprising communication circuitry coupled to the first memory emulator and to the second memory emulator.

13. The digital system of claim 9 being a cellular telephone, further comprising a processor module and a memory module coupled to the memory interposer.

14. The digital system of claim 9, further comprising a processor module and a memory module coupled to the memory interposer to form a package-on-package module.

* * * * *